US009372686B1

(12) United States Patent
Bushnell et al.

(10) Patent No.: US 9,372,686 B1
(45) Date of Patent: Jun. 21, 2016

(54) MAINTAINING PACKAGE REPOSITORIES

(71) Applicant: Google Inc., Mountain View, CA (US)

(72) Inventors: Thomas Bushnell, Los Angeles, CA (US); Sebastian Harl, Munich (DE)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 14/582,350

(22) Filed: Dec. 24, 2014

(51) Int. Cl.
*G06F 9/44* (2006.01)
*G06F 7/00* (2006.01)
*G06F 17/00* (2006.01)
*G06F 9/445* (2006.01)
*G06F 17/30* (2006.01)

(52) U.S. Cl.
CPC .. *G06F 8/71* (2013.01); *G06F 8/65* (2013.01); *G06F 8/70* (2013.01); *G06F 17/30575* (2013.01); *G06F 17/30589* (2013.01)

(58) Field of Classification Search
None
See application file for complete search history.

(56) References Cited

U.S. PATENT DOCUMENTS

| | | | |
|---|---|---|---|
| 7,739,234 B1 * | 6/2010 | Figge | G06F 17/30955 707/610 |
| 8,255,363 B2 | 8/2012 | Johnson et al. | |
| 2007/0106412 A1 * | 5/2007 | Esau | G06Q 10/0637 700/99 |
| 2010/0042990 A1 | 2/2010 | Kinder | |
| 2014/0358876 A1 * | 12/2014 | Bhattacharjee | G06F 17/30309 707/695 |
| 2015/0178328 A1 * | 6/2015 | Stephan, III | G06F 17/30292 707/803 |

* cited by examiner

*Primary Examiner* — Lewis A Bullock, Jr.
*Assistant Examiner* — Mark Gooray
(74) *Attorney, Agent, or Firm* — Honigman Miller Schwartz and Cohn LLP

(57) ABSTRACT

A method includes resolving a new direct repository within non-transitory memory by a computing device in communication with the non-transitory memory in response to a package content update associated with a lineage of direct repositories. The method includes applying a tag to each direct repository and determining whether the tag applied to the new direct repository matches an indirection tag associated with an unresolved indirect repository. The indirection tag includes a key-value pair indicating a status of the corresponding direct repository. The method further includes resolving the indirect repository by the computing device when the tag applied to the new direct repository matches the indirection tag. The resolved indirect repository points to the new direct repository.

22 Claims, 11 Drawing Sheets

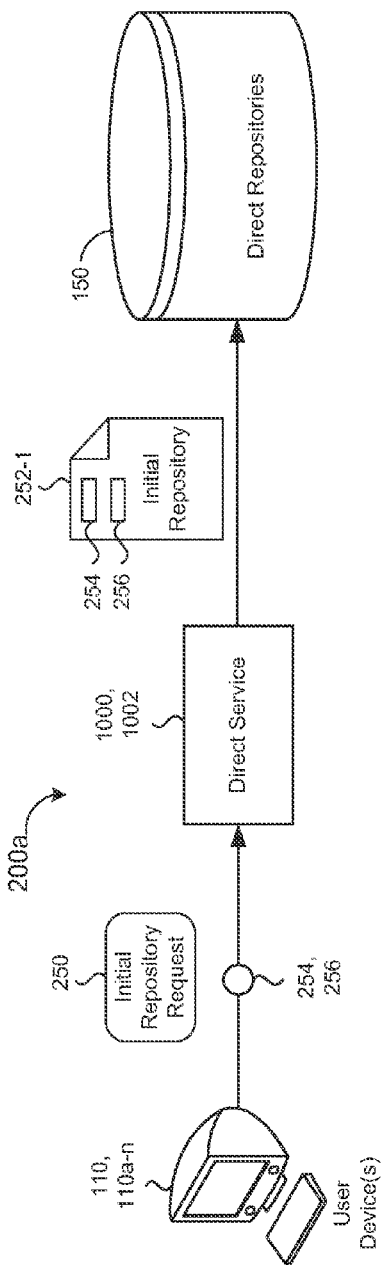
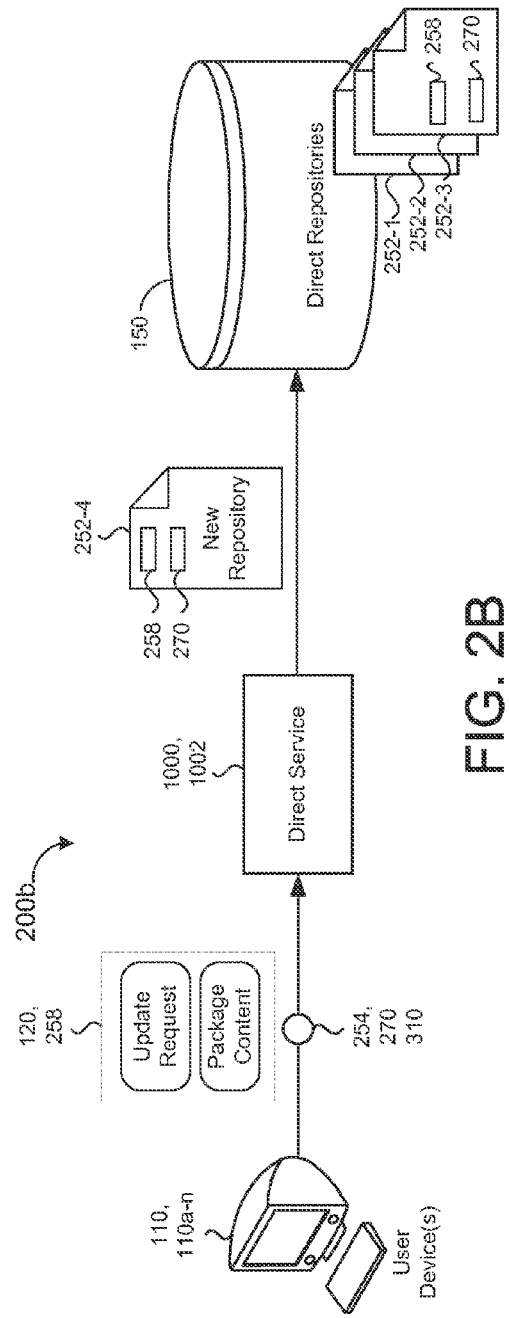

MAINTAINING PACKAGE REPOSITORIES

TECHNICAL FIELD

This disclosure relates to maintaining repositories for distributing and releasing access to packages for software programs stored in the repositories.

BACKGROUND

Software packages are generally stored in a repository as static files or tables accessed through a production server. Managing these repositories generally requires a client to request the production server to provide an entire index of all the packages in the repository, and then the client requests the production server to provide a particular package from the index that the client wants to access. Since the packages are stored statically, clients have no way of querying the packages within the repository without first obtaining the entire index of all the packages. Prior versions of repositories are generally removed upon new version updates, making a history of different versions of the repository since its creation un-obtainable. A history is generally not maintained when making changes to the repositories, making each repository directly visible and tracked by clients accessing them. Moreover, managing repositories generally provides no ability for repositories to appear differently between clients. Thus, configurations pertaining to what repository a given client uses are generally stored on that client, rather than the production server.

SUMMARY

One aspect of the disclosure provides a method that includes resolving a new direct repository within non-transitory memory by a computing device in communication with the non-transitory memory in response to a package content update associated with a lineage of direct repositories. The method includes applying a tag to each direct repository and determining whether the tag applied to the new direct repository matches an indirection tag associated with an unresolved indirect repository. The indirection tag includes a key-value pair indicating a status of the corresponding direct repository. The method further includes resolving the indirect repository by the computing device when the tag applied to the new direct repository matches the indirection tag. The resolved indirect repository points to the new direct repository.

Implementations of the disclosure may include one or more of the following optional features. In some implementations, for subsequently resolved new indirect repositories, the computing device updates the new indirect repository to point to the latest new direct repository including the applied tag that matches the indirection tag. In some examples, when resolving the new indirect repository to point to the latest new direct repository, the computing device increments a flag associated with the indirect repositories and stores a dynamic list of previous indirect repositories within the non-transitory memory. The flag may indicate a version associated with each indirect repository and each previous indirect repository may be identified by the associated flag and the indirection tag. Optionally, the computing device receives a pull request including the indirection tag and the flag associated with the previous indirect repository to pull a previous indirect repository within the non-transitory memory, retrieves the previous indirect repository from the non-transitory memory using the indirection tag and the flag included in the pull request, and transmits the previous indirect repository to a user device in communication with the computing device. In some implementations, the computing device receives an update request to at least one of add one or more packages to or remove one or more packages from the lineage of direct repositories, and updates the package content associated with the lineage of package repositories in response to the request.

In some implementations, the indirect repository includes a repository identifier and a list of one or more package versions. The package versions may be associated with a latest version of a software distribution, a latest release version of the software distribution or a release candidate version of the software distribution. Optionally, the package version may be associated with a verified secure version of the software distribution. In some examples, applying a tag to each of the direct repository includes applying a first tag to direct repositories corresponding to a rolling development version of a software distribution. In other examples, applying a tag to each of the direct repository includes applying a second tag to direct repositories corresponding to a release candidate version of the software distribution. In even other examples, applying a tag to each of the direct repository includes applying a third tag to direct repositories corresponding to a latest release version of the software distribution. Optionally, the computing device applies a security tag to each of the direct repositories. The security tag includes a key-value pair indicating whether or not the direct repository applying the security tag is verified as being secure. In some examples, the computing device requires that the security tag applied to the new direct repository indicates that the new direct repository is verified as being secure when resolving the indirect repository pointing to the new direct repository.

In some implementations, the computing device resolves a union repository including a combination of a plurality of member repositories stored within the non-transitory memory. Each member repository includes a list of one or more package names. In some examples, the computing device identifies an assigned priority and an assigned sort order for each of the member repositories and obtains prioritized package names from the member repositories for inclusion in the union repository based on the assigned priorities and the assigned sort orders. Optionally, the computing device identifies whether one or more package names exist in more than one of the member repositories when the prioritized package names are obtained from the member repositories for inclusion in the union repository. In one example, for each package name that exists in more than one of the member repositories, the computing device obtains the package name from the member repository with a highest assigned priority. In another example, when at least two of the more than one member repositories both include the highest assigned priority, the computing device obtains the package name from the member repository associated with a highest version of the package name. In yet another example, when at least two of the more than one member repositories both include the highest priority and are both associated with the highest version of the package name, the computing device obtains the package name from the member repository associated with a highest assigned sort order.

In some examples, the computing device resolves a union repository including a combination of one or more version-specific repositories within the non-transitory memory associated with a software distribution. Each version-specific repository may be assigned a different workstation-specific label and the union repository may be unlabeled. Examples include the computing device receiving an access request from a client device in communication with the computing device to obtain the software distribution, and in response to the access request, determining whether the client device is associated with one of the assigned workstation-specific labels. In some examples, when the client device is associated with one of the assigned workstation-specific labels, the computing device distributes the version-specific repository including the workstation-specific label associated with the client device from the computing device to the client device. Optionally, the computing device receives a management request from a user device to view all client devices accessing a target version-specific repository. The management request may include the workstation-specific label assigned to the target version-specific repository. In some examples, in response to the management request, the computing device queries the one or more version-specific repositories within the non-transitory memory using the workstation-specific label. The computing device may obtain a list of all client devices accessing the target version-specific label based on the query and transmits the list of client devices from the computing device to the user device.

In some implementations, the computing device resolves a canary repository comprising a list of target repositories within the non-transitory memory, each target repository associated with different package content for a software distribution. The list of target repositories may include a release candidate repository corresponding to a release candidate version of the software distribution, and a stable repository corresponding to a latest release version of the software distribution. In some examples, the computing device dynamically assigns a distribution weight to each of the target repositories. Optionally, the computing device receives one or more access requests from client devices in communication with the computing device to obtain the software distribution, each access request being associated with a corresponding workstation-specific label or being unlabeled. Optionally, in response to an access request being associated with one or more workstation-specific labels, the computing device randomly distributes the release candidate repository to a first percentage of the client devices and randomly distributes the stable repository to a second percentage of the client devices. The first and second percentages may be based on the dynamically assigned distribution weights.

Another aspect of the disclosure provides a remote system including one or direct service processing devices executing a direct service and one or more indirect service processing devices in communication with the one or more direct service processing devices and executing an indirect service. The direct service resolves a new direct repository within the non-transitory memory in response to a package content update associated with a lineage of direct repositories. The new direct repository corresponds to a latest direct repository of the lineage of direct repositories for storing package content. The direct service further applies a tag to each direct repository, each tag including a key-value pair indicating a status of the corresponding direct repository. The indirect service determines whether the tag applied to the new direct repository matches an indirection tag associated with an unresolved indirect repository, and when the tag applied to the new direct repository matches the indirection tag, the indirect service resolves the indirect repository pointing to the new direct repository.

This aspect may include one or more of the following optional features. In some implementations, the direct service updates, for subsequently resolved new direct repositories, a new direct repository to point to the latest new direct repository including the applied tag that matches the indirection tag. In some examples, when resolving the new indirect repository to point to the latest new direct repository, the indirect service increments a flag associated with the indirect repositories and stores a dynamic list of previous indirect repositories within the non-transitory memory. The flag may indicate a version associated with each indirect repository and each previous indirect repository may be identified by the associated flag and the indirection tag. Optionally, the indirect service, at the one or more indirect service processing devices, receives a pull request including the indirection tag and the flag associated with the previous indirect repository to pull a previous indirect repository within the non-transitory memory, retrieves the previous indirect repository from the non-transitory memory using the indirection tag and the flag included in the pull request and transmits the previous indirect repository to a user device in communication with the indirect service. In some implementations, the direct service, at the one or more direct service processing devices, receives an update request to at least one of add one or more packages to or remove one or more packages from the lineage of direct repositories, and updates the package content associated with the lineage of package repositories in response to the request.

In some implementations, the indirect repository includes a repository identifier and a list of one or more package version. The package versions may be associated with a latest version of a software distribution, a latest release version of the software distribution or a release candidate version of the software distribution. Optionally, the package version may be associated with a verified secure version of the software distribution. In some examples, the direct service, at the one or more direct service processing devices applies a first tag to direct repositories corresponding to a rolling development version of a software distribution. In other examples, the direct service, at the one or more direct service processing devices applies a second tag to direct repositories corresponding to a release candidate version of the software distribution. In even other examples, the direct service, at the one or more direct service processing devices applies a third tag to direct repositories corresponding to a latest release version of the software distribution. Optionally, the direct service, at the one or more direct service processing devices, applies a security tag to each of the direct repositories. The security tag includes a key-value pair indicating whether or not the direct repository applying the security tag is verified as being secure. In some examples, the indirect service, at the one or more indirect service processing device, requires that the security tag applied to the new direct repository indicates that the new direct repository is verified as being secure when the indirect repository pointing to the new direct repository resolves.

In some implementations, the system further includes one or more union processing devices executing a union service. In some examples, the union service resolves a union repository including a combination of a plurality of member repositories stored within the non-transitory memory. Each member repository includes a list of one or more package names. In some examples, the union service identifies an assigned priority and an assigned sort order for each of the member repositories and obtains prioritized package names from the member repositories for inclusion in the union repository based on the assigned priorities and the assigned sort orders. Optionally, the union service identifies whether one or more package names exist in more than one of the member repositories when the prioritized package names are obtained from the member repositories for inclusion in the union repository. In one example, for each package name that exists in more than one of the member repositories, the union service obtains the package name from the member repository with a highest assigned priority. In another example, when at least two of the more than one member repositories both include the highest assigned priority, the union repository obtains the package name from the member repository associated with a highest version of the package name. In yet another example, when at least two of the more than one member repositories both include the highest priority and are both associated with the highest version of the package name, the union service obtains the package name from the member repository associated with a highest assigned sort order.

In some examples, the union service, at the one or more union service processing devices, resolves a union repository including a combination of one or more version-specific repositories within the non-transitory memory associated with a software distribution. Each version-specific repository may be assigned a different workstation-specific label and the union repository may be unlabeled. Examples include the union service, at the one or more union service processing devices, receiving an access request from a client device in communication with the union service to obtain the software distribution, and in response to the access request, determining whether the client device is associated with one of the assigned workstation-specific labels. In some examples, when the client device is associated with one of the assigned workstation-specific labels, the union service, at the one or more union service processing devices, distributes the version-specific repository including the workstation-specific label associated with the client device from the union service to the client device. Optionally, the union service, at the one or more union service processing devices, receives a management request from a user device to view all client devices accessing a target version-specific repository. The management request may include the workstation-specific label assigned to the target version-specific repository. In some examples, in response to the management request, the union service, at the one or more union service processing devices, queries the one or more version-specific repositories within the non-transitory memory using the workstation-specific label. The union service, at the one or more union service processing devices, may obtain a list of all client devices accessing the target version-specific label based on the query and transmits the list of client devices from the union service to the user device.

In some implementations, the system further includes one or more canary service processing devices executing a canary service. The canary service may resolve a canary repository comprising a list of target repositories within the non-transitory memory, each target repository associated with different package content for a software distribution. The list of target repositories may include a release candidate repository corresponding to a release candidate version of the software distribution, and a stable repository corresponding to a latest release version of the software distribution. In some examples, the canary service, at the one or more canary service processing devices, dynamically assigns a distribution weight to each of the target repositories. Optionally, the canary service receives one or more access requests from client devices in communication with the canary service to obtain the software distribution, each access request being associated with a corresponding workstation-specific label or being unlabeled. Optionally, in response to an access request being associated with one or more workstation-specific labels, the canary service, at the one or more canary service processing devices, randomly distributes the release candidate repository to a first percentage of the client devices and randomly distributes the stable repository to a second percentage of the client devices. The first and second percentages may be based on the dynamically assigned distribution weights.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A and 2B show schematic views of the repository manager of FIG. 1 executing a direct service for resolving direct repositories within the direct and indirect repositories.

Like reference symbols in the various drawings indicate like elements.

DETAILED DESCRIPTION

Figure 1:
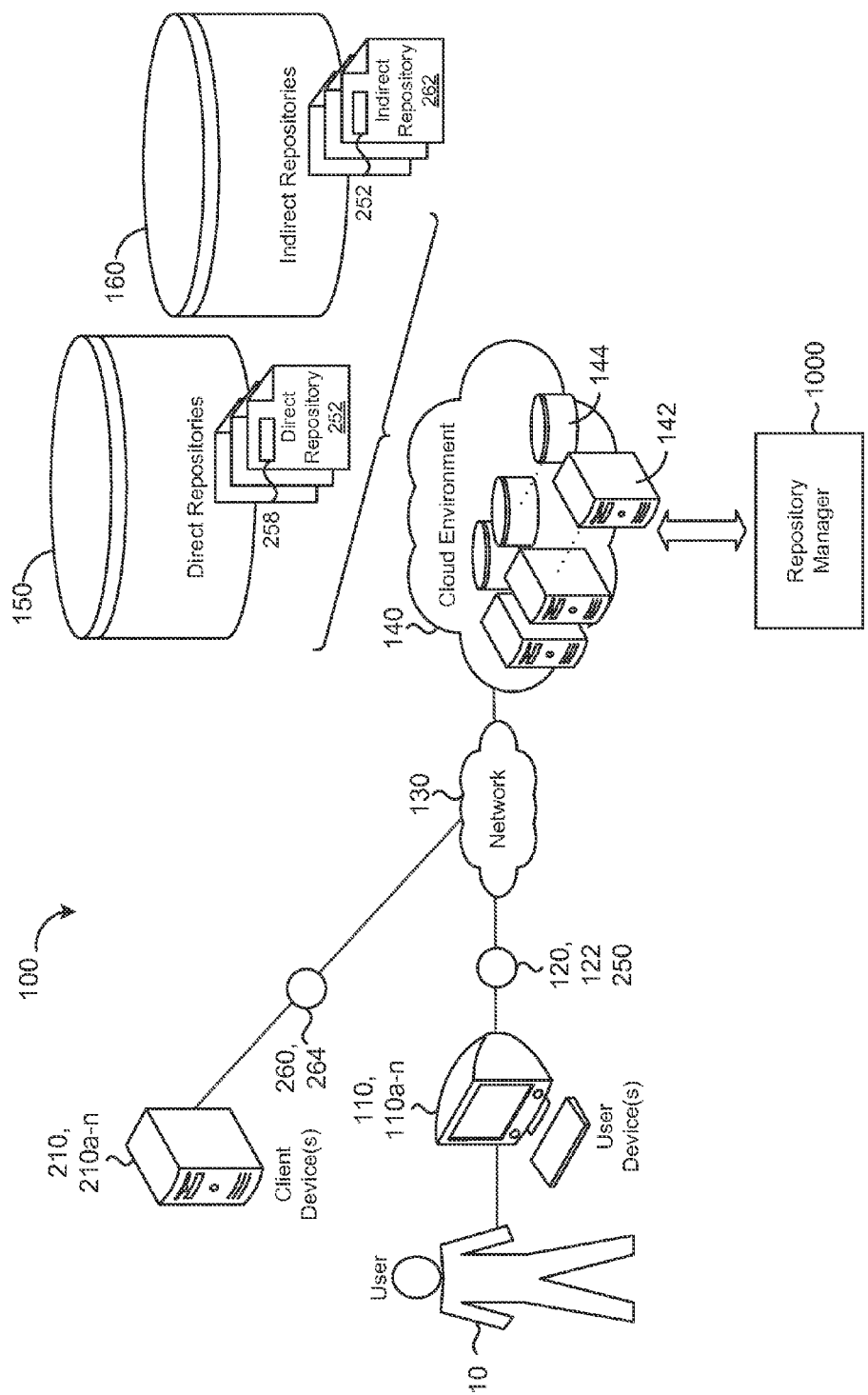
FIG. 1 is a schematic view of an example system for managing non-transitory direct and indirect repositories.

Referring to FIG. 1, in some implementations, a system 100 includes one or more user devices 110a-n associated with a user 10, who may communicate, via a network 130, with a remote system 140. The system may further include one or more client devices 210a-n associated with a client(s), who may communicate, via the network 130, with the remote system 140. The remote system 140 may be a distributed system (e.g., cloud environment) having scalable/elastic resources 142. The resources 142 may include computing resources 144 and/or storage resources 146. In some examples, the remote system 140 communicates with non-transitory direct repositories 150 and indirect repositories 160 within non-transitory memory. In some implementations, the remote system 140 executes a repository manager 1000 for managing access to the non-transitory direct repositories 150 and the non-transitory indirect repositories 160.

The user devices 110 and the client devices 210 can be any computing devices that are capable of communicating with the repository manager 1000 through the network 130. The user and client devices 110, 210, respectively, include, but are not limited to, desktop computing devices and mobile computing devices, such as laptops, tablets, smart phones, and wearable computing devices (e.g., headsets and/or watches).

The non-transitory direct repositories 150 may include a lineage of direct repositories 252. In some examples, each direct repository 252 of the lineage may store package content 258 for a software distribution that may be deployed to the one or more client devices 220. As used herein, the package content 258 may refer to a collection of packages each having a unique package name and a version string denoting the package version by which the package is named. In some implementations, the user devices 110 correspond to adminstrator devices that communicate with the repository manager 1000 for managing the direct and indirect repositories 150, 160, respectively. In some examples, the repository manager 1000 receives an initial repository request 250 from the user device 110 to resolve a new initial direct repository 252 within the non-transitory direct repositories 150. The repository manager 1000 may receive an update request 120 from the user device 110 to update the package content 258 associated with the lineage of direct repositories 252. In some implementations, the repository manager 1000 receives a pull request 122 from the user device 110 to pull a previous indirect repository 262 within the non-transitory indirect repositories 160. The repository manager 1000 may store a dynamic list of previous indirect repositories 262 within the non-transitory indirect repositories 160, wherein each previous indirect repository 262 points to a corresponding direct repository 252 of the lineage of direct repositories 252.

In some implementations, the repository manager 1000 receives an access request 260 from the client device 210 to obtain a software distribution such that the client device 210 unknowingly receives a version-specific repository 852 for the software distribution from a union repository 862 (FIG. 8) in communication with the repository manager 1000. In other implementations, the repository manager 1000 receives an access request 264 from the client device 210 to obtain a software distribution, such that the client device 210 randomly and unseeingly receives a target repository 952 from a list of target repositories 952a-c from a canary repository 962 (FIG. 9), where each target repository 952 includes different package content for the software distribution. Union repositories and canary repositories will be described in greater detail with reference to FIGS. 6-9.

Referring to FIGS. 2A and 2B, in some implementations, the repository manager 1000 executes a direct service 1002 for resolving an initial direct repository 252-1 within the non-transitory direct repositories 150 (FIG. 2A) and for resolving a new direct repository 252-4 corresponding to a latest direct repository descending from the initial indirect repository 252-1 when package content 258 associated with the lineage of direct repositories updates (FIG. 2B).

Referring to FIG. 2A, the direct service 1002 receives the initial repository request 250 from the user device 110 to resolved the initial direct repository 252-1 within the non-transitory direct repositories 150. In some examples, the initial direct repository 252-1 is an empty repository associated with a given name, resolve date, and lineage identifier. In the example shown, the initial direct repository 252-1 is associated with a lineage identifier equal to 1. In some implementations, the initial repository request 250 includes a repository identifier 254 corresponding to the given name for the initial direct repository 252-1 and an access control list 256 (ACL) indicating one or more devices having permission to access the initial indirect repository 252-1 and any subsequently resolved direct repositories 252 that descend from the initial direct repository 252-1. The direct service 1002 may store the initial direct repository 252-1 including the repository identifier 254 and the ACL 256 within the non-transitory direct repositories 150.

Referring to FIG. 2B, in response to a package content 258 update associated with the lineage of direct repositories 252, the direct service 1002 resolves a new direct repository 252 corresponding to a latest direct repository 252n of the lineage of direct repositories 252 descending from the initial direct repository 252-1. The new direct repository 252 resolved is assigned a date. In some implementations, the update request 120 includes the repository identifier 254 associated with a given name for the lineage of direct repositories 252 and a user identifier 310 that the direct service 1002 verifies with the ACL 256. In some examples, the update request 120 includes the package content 258 update corresponding to at least one of one or more packages to add to the lineage of direct repositories 252 or one or more packages to remove from the lineage of direct repositories 252.

In the example shown, the direct service 1002 resolves a fourth new direct repository 252-4 of the lineage of direct repositories 252 upon receiving the update request 120 from the user device 110 to update the package content 258 associated with the lineage of direct repositories 252. Here, the direct service 1002 stores the fourth new direct repository 252-4 within the non-transitory direct repositories 150 along with preceding direct repositories 252-2 and 252-3 that descend from the empty initial direct repository 251-1 all associated with the given name, resolve date, and lineage identifier. The individual direct repositories 252n are not modified, but rather, the lineage of direct repositories 252 is modified/updated by resolving the new direct repository for each package content 258 update. Accordingly, the lineage of direct repositories 252 correspond to a static list of package content 258 that does not enable a client device 210 to download the package content 258 by simply calling out the given name to the lineage of package repositories 252.

In some implementations, the direct service 1002 applies a tag 270 to each direct repository 252. In the example shown, the direct service 1002 receives the tag 270 within the update request 120. The tag 270 may include a key-value pair indicating a status of the corresponding direct repository 252. For instance, the term "key" may refer to a status indicator for the corresponding direct repository 252 while the term "value" may indicate whether the associated key is true or false. Example "keys" may include, but are not limited to, the corresponding direct repository associated with a latest version of a software distribution, a latest release version of the software distribution, a release candidate version of the software distribution; or a verified secure version of the software distribution. In some examples, the tag 270 includes a programming format corresponding to acl.key:value, where acl is an access control list identifying what devices can modify the associated tag 270, and the key and value are substantially arbitrary strings that may not include dots or colons.

Figure 3:
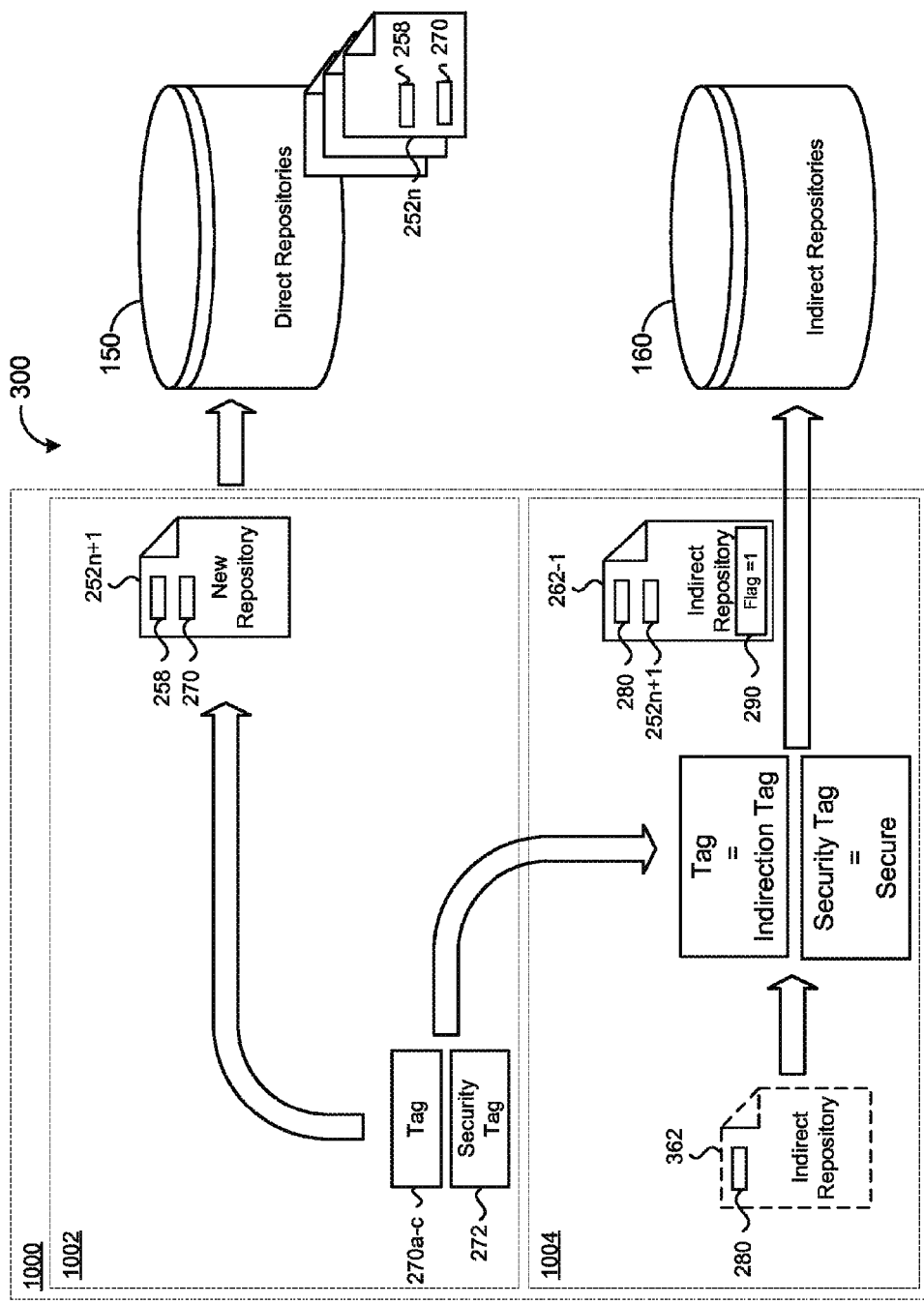
FIG. 3 shows a schematic view of an example new indirect repository resolved by an indirect service executed by the repository manager of FIG. 1.

FIG. 3 shows a schematic view 300 of an example new indirect repository 262-1 resolved by an indirect service 1004 executed by the repository manager 1000. In some implementations, the direct service 1002 applies the tag 270 to each new resolved direct repository 252n+1 and associated package content 258 stored in the non-transitory direct repositories 150. In some examples, the direct service 1002 applies a first tag 270a to direct repositories corresponding to a rolling development version of a software distribution. In some examples, the direct service applies a second tag 270b to direct repositories 252 corresponding to a release candidate version of the software distribution. In some examples, the direct service applies a third tag 270c to direct repositories 252 corresponding to a latest release version of the software distribution.

Each tag 270 applied by the direct service 1002 may be provided to the indirect service 1004 to determine whether the tag 270 applied to the new direct repository 252n+1 matches an indirection tag 280 associated with an unresolved indirect repository 362. An unresolved indirect repository refers to a direct repository 252 associated with a specific tag 270 that the indirection service 1004 will resolve into an indirect repository 262 when the tag 270 matches the indirection tag 280 applied. Accordingly, when the tag 270 applied to the new direct repository 252n+1 matches the indirection tag 280 (e.g., "Tag=Indirection Tag"), the indirect service 1004 resolves the indirect repository 262-1 pointing to the new direct repository 252n+1. The indirect service 1004 may store the new indirect repository 262-1 within the non-transitory indirect repositories 160, wherein the new indirect repository 262-1 may be identifiable by the indirection tag 280 and a flag 290 indicating a version associated with the new indirect repository 262-1. In the example shown, the flag 290 associated with the indirect repository 262-1 is equal to one indicating the indirect repository 262 that was resolved first.

In some implementations, the direct service 1002 may additionally or alternatively apply a security tag 272 to each to each new resolved direct repository 252n+1. The security tag may include a key-value pair indicating whether the corresponding direct repository 252n+1 is verified by the indirect service 1004 as being secure. For instance, the direct service 1002 may apply the security tag 272 requiring a security group to approve the corresponding direct repository 252n+1 as being secure. In other words, prior to when the indirect service 1004 resolves the indirect repository 262-1 pointing to the new direct repository 252n+1, the indirect service 1004 may require the security tag 272 applied to the new direct repository 252n+1 to indicate that the new direct repository 252n+1 is verified as being secure.

Figure 4:
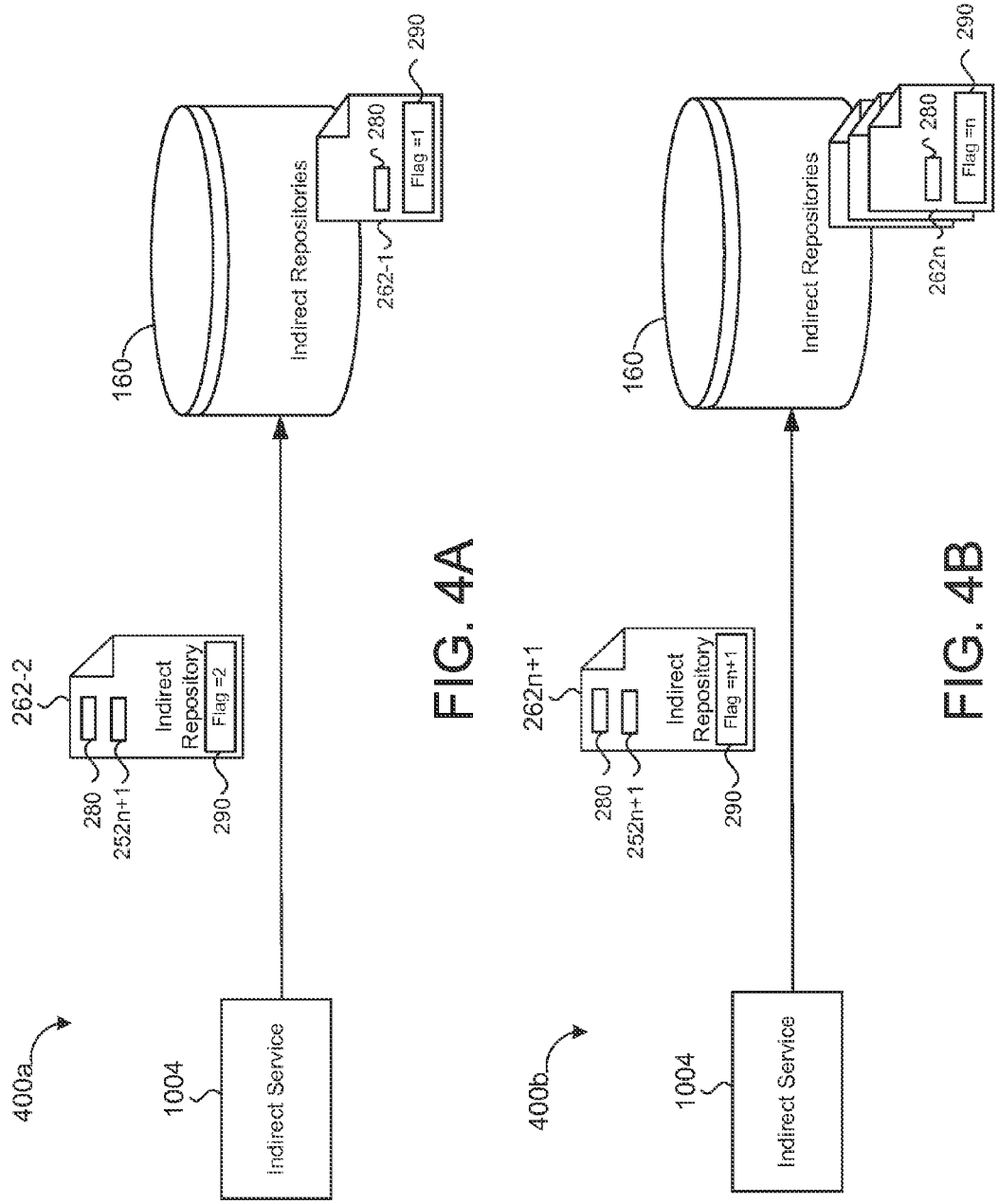
FIGS. 4A and 4B show schematic views of the indirect service of FIG. 3 resolving new direct repositories.

Referring to FIGS. 4A and 4B, in some implementations, schematic views 400a and 400b show the indirect service 1004 resolving new direct repositories 262n each time a latest new direct repository 252n+1 includes the applied tag 270 that matches the indirection tag 280. As shown in FIG. 4A, a subsequently resolved new indirect repository 262-2 is updated (from the previous indirect repository 262-1) to point to the latest new direct repository 252n+1. The new indirect repository 262-2 may be associated with the indirection tag 280 and the corresponding latest new direct repository 252n. In some examples, the flag 290 associated with the corresponding new indirect repository 262-2 is incremented. Thus, the flag 290 associated with indirect repository 262-2 is equal to two indicating a second subsequent version of the package content 258 associated with the latest new direct repository 252n. The indirect repository 262-2 may be stored within the non-transitory indirect repositories 160 with the previous indirect repository 262-1. FIG. 4B shows for subsequently resolved new indirect repositories 262n+1, the indirect service 1004 updates the new indirect repository 262n+1 to point to the latest new direct repository 252n+1 including the applied tag 270 that matches the indirection tag 280. Thus, each subsequent new indirect repository 262n+1 is associated with the indirection tag 280, the corresponding latest new direct repository 252n+1 and the incremented flag 290. Accordingly, the indirect service 1004 may store a dynamic list of previous indirect repositories 262n within the non-transitory indirect repositories 160, wherein each previous indirect repository is identified by the associated flag 290 and the indirection tag 280.

Figure 5:
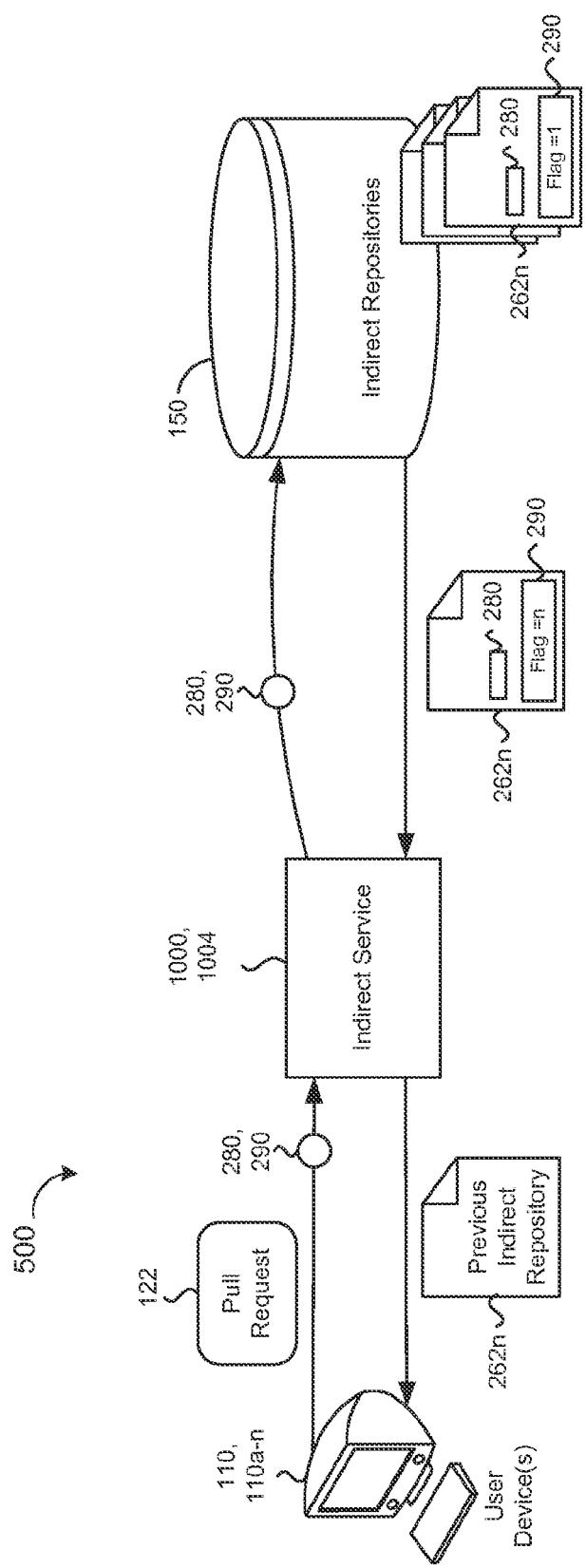
FIG. 5 shows a schematic view of the indirect service transmitting a previous indirect repository to the user device.

FIG. 5 shows a schematic view 500 of the indirect service 1004 transmitting a previous indirect repository 562n to the user device 110. In some implementations, the indirect service 1004 receives the pull request 122 to pull a previous indirect repository 262n within the non-transitory indirect repositories 160. The pull request 122 may include the indirection tag 280 and the flag 290 associated with the previous indirect repository 262n that the user device 110 desires to pull. In the example shown, the indirect service 1004 retrieves the previous indirect repository 262n from the non-transitory indirect repositories 160 using the indirection tag 280 and the flag 290 included in the pull request 122. The indirect service 1004 may provide the retrieved previous indirect repository 262n to the user device 110. Thus, storing the dynamic list of previous indirect repositories 262n by the indirect service 1004 enables user devices 110 to pull prior versions of package content 258 associated with the corresponding direct repository 252n. In other words, prior versions of package content 258 for a software distribution may be rolled back to user devices 110 by providing the indirection tag 280 and the flag 290 associated with the previous indirect repository 262n.

Figure 6:
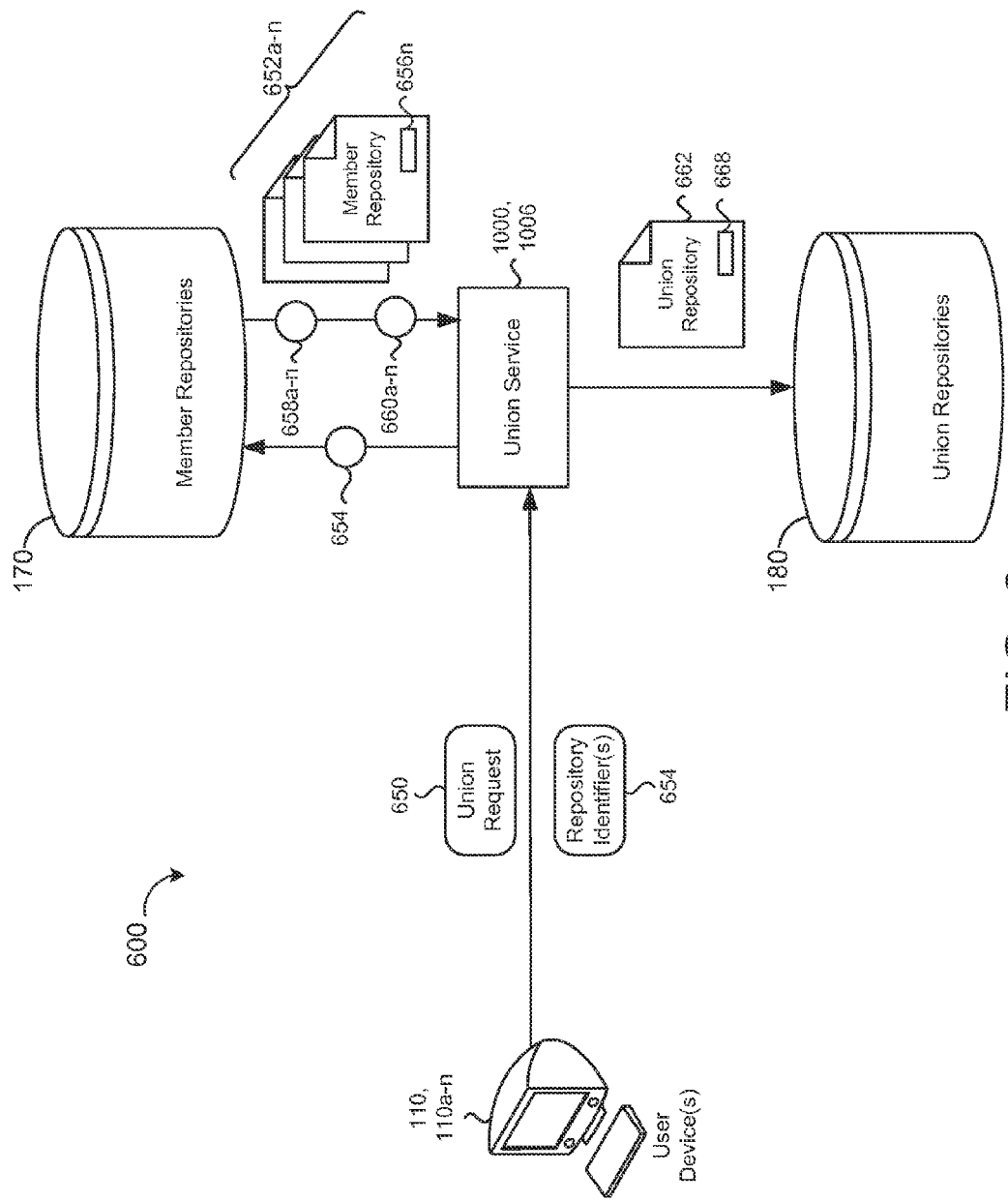
FIG. 6 shows a schematic view of an example union repository resolved by a union service executed by the repository manager of FIG. 1.

Referring to FIG. 6, in some implementations, the repository manager 1000 executes a union service 1006 for resolving a union repository 662 within non-transitory union repositories 180 of the non-transitory memory. The union repository 662 includes a combination of a plurality of member repositories 652a-n stored within non-transitory member repositories 170 of the non-transitory memory. In the example shown, each member repository 652 includes a list of corresponding package names 656 for a software distribution. In some implementations, the union service 1006 receives a union request 650 to resolve the union repository 662. The union request 650 may include a list of repository identifiers 654 corresponding to each of the member repositories 652 for inclusion in the union repository 662. In some examples, the union service 1006 retrieves the combination of member repositories 652a-n from the non-transitory member repositories 170 using the list of repository identifiers 654. In some implementations, upon retrieving the member repositories 652, the union service 1006 identifies an assigned priority 658 and an assigned sort order 660 for each of the member repositories 652, and obtains prioritized package names 668 from the retrieved member repositories 652 for inclusion in the union repository 662 based on the assigned priorities 658a-n and the assigned sort orders 660a-n.

Figure 7:
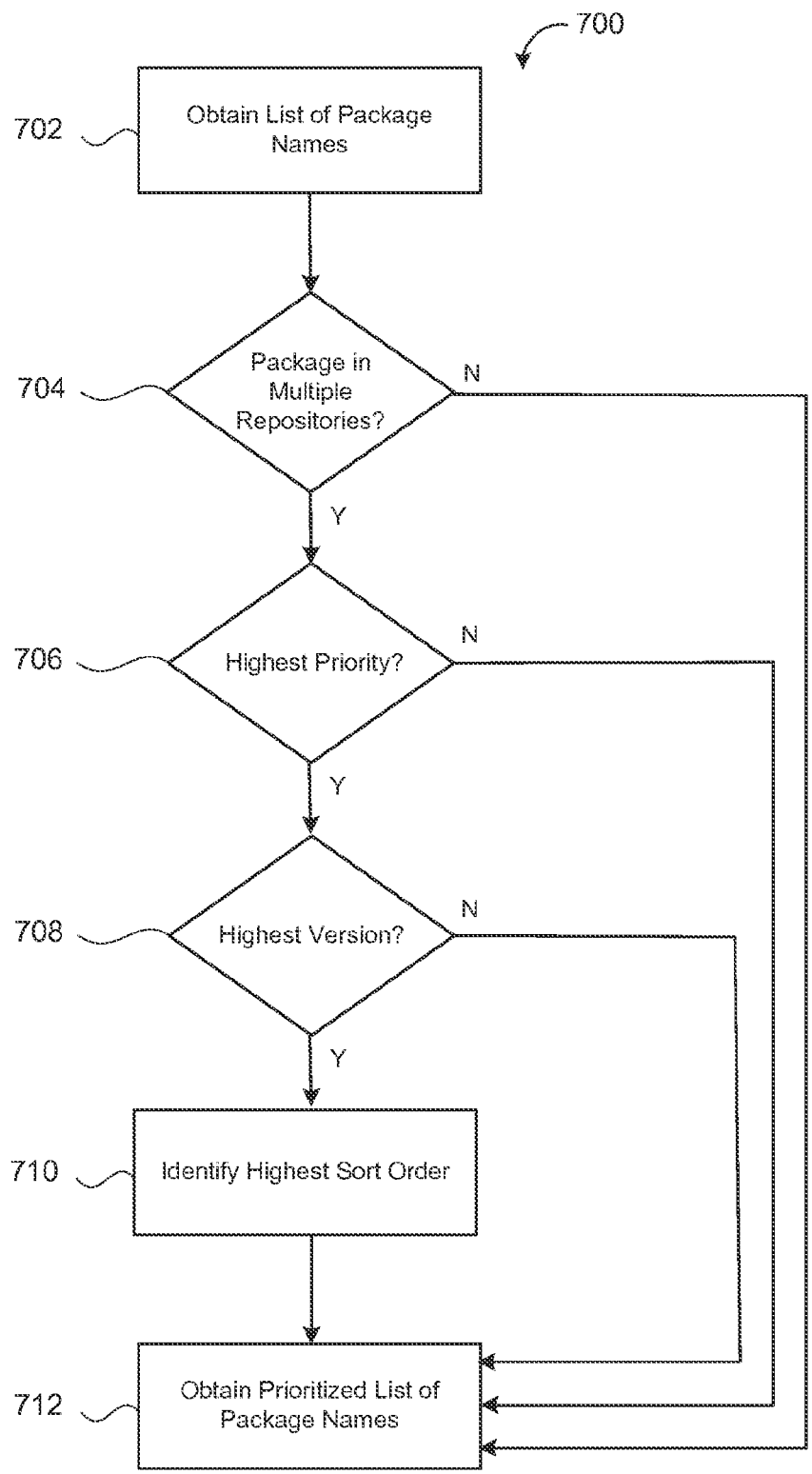
FIG. 7 is an exemplary flowchart for obtaining prioritized package names for inclusion in a union repository.

FIG. 7 is a flowchart 700 of example operations performable by the union service 1006 of FIG. 6 for obtaining the prioritized package names 668 for inclusion in the union repository 662. At operation 702, the union service 1006 obtains the list of package names 656 from the retrieved member repositories 652. At operation 704, the union service 1006 identifies from the list of package names 656 whether one or more package names exist in more than one of the member repositories 652. If none of the pkkage names 656 exist in more than one of the member repositories 652 ("N"), then the flowchart 700 advances to operation 712 wherein the union service 1006 obtains the prioritized package names 668 corresponding to the list of package names. If one or more package names are determined to exist in more than one of the member repositories 652 ("Y"), then the flowchart 700 advances to operation 706. In some implementations, the union service 1006 compares the assigned priority 658 for each member repository 652 including a common package name 656. At operation 706, the union service 1006 determines if at least two of the member repositories 652 including the common package name 656 both include a highest assigned priority. If one of the member repositories 652 includes the highest assigned priority 658 ("N"), then the flowchart 700 advances to operation 712 wherein the union service 1006 obtains the common package name 656 from the member repository 652 with the highest priority for inclusion in the list of prioritized package names 668. If at least two of the member repositories 652 both include the highest assigned priority 658 ("Y"), then the flowchart 700 advances to operation 708. At operation 708, the union service 1006 compares a version number of the common package name 656 existing in the member repositories 652, and determines if at least two of the member repositories 652 are associated with a highest version of the common package name 656. If one of the member repositories 652 includes the highest version of the package name ("N"), then the flowchart 700 advances to operation 712 wherein the union service 1006 obtains the common package name 656 from the member repository 652 including the highest version of the common package name 656 for inclusion in the list of prioritized package names 668. If at least two of the member repositories 652 both include the highest version of the common package name 656 ("Y"), the flowchart 700 advances to operation 710. At operation 710, the union service 1006 identifies a highest assigned sort order 660 for each of the member repositories 652 including the common package name 656. The union service 1006 may obtain the common package name 656 from the member repository 652 with the highest assigned sort order 660 for inclusion in the list of prioritized package names 668 at operation 712.

Figure 8:
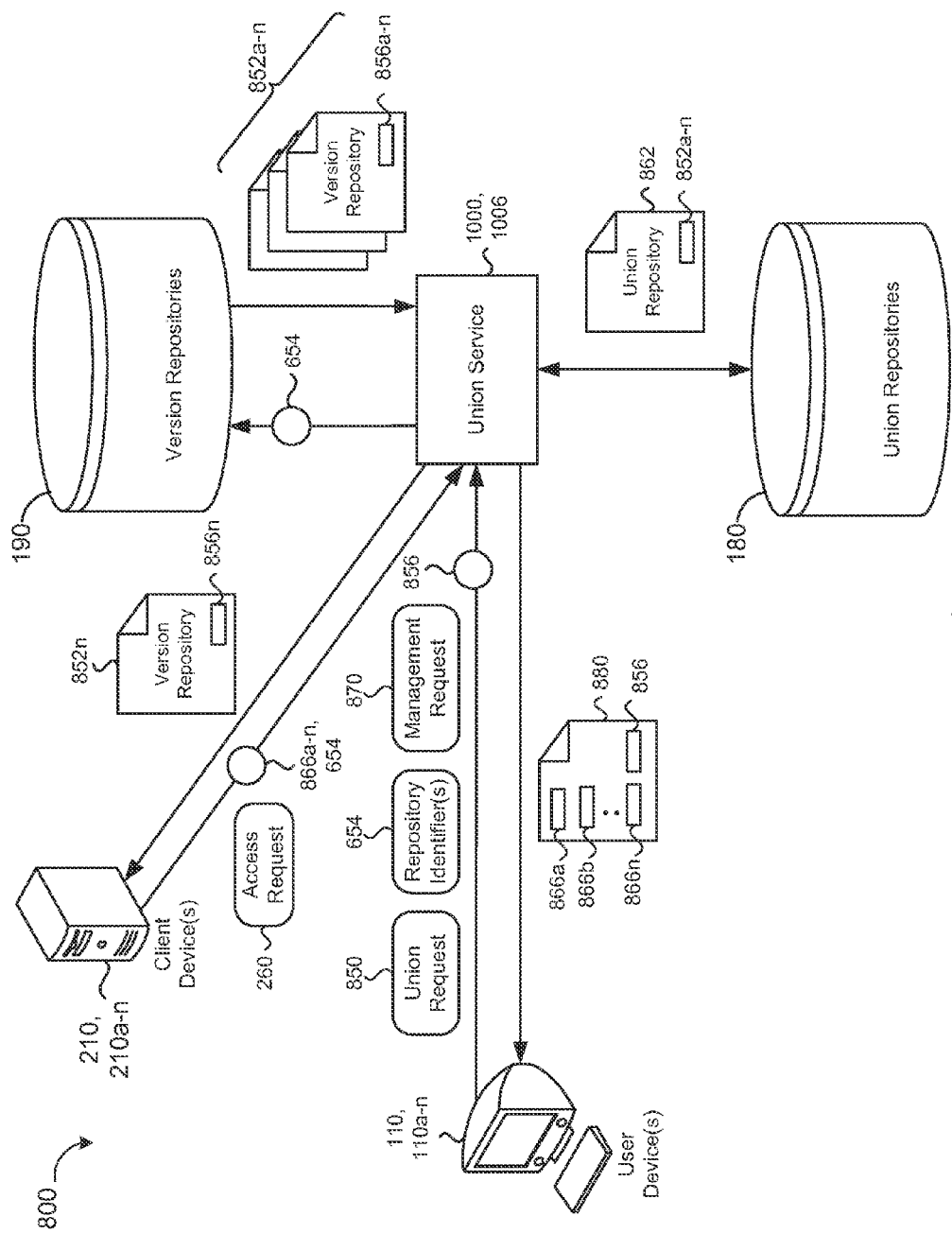
FIG. 8 shows a schematic view of an example union repository resolved by a union service executed by the repository manager of FIG. 1.

Referring to FIG. 8, in some implementations, the union service 1006 resolves a union repository 862 that includes a combination of one or more version-specific repositories 852a-n obtained from non-transitory version repositories 190 of the non-transitory memory. In some examples, the version-specific repositories 852a-n are resolved in the same manner as the indirect repositories 262, as described above with reference to FIGS. 3-5. In some implementations, the repository manager 1000 assigns a different workstation-specific label 856a-n to each of the venue-specific repositories 852a-n stored within the non-transitory version repositories 190. Accordingly, each of the venue-specific repositories 852a-n include a different version that may be configured for a specific workstation (e.g., client device 210) such that different repositories for the same software distribution may be deployed to the client devices 210 based on the type of workstation (as indicated by the workstation-specific label 856) associated with each client device 210.

In the example shown, the union service 1006 resolves the union repository 862 in response to a union request 850 received from the user device 110. The union request 850 may include a list of repository identifiers 654 corresponding to each of the venue-specific repositories 852 for inclusion in the union repository 862. In some examples, the union service 1006 retrieves the combination of member repositories 852a-n from the non-transitory version repositories 190 using the list of repository identifiers 654. The union service 1006 may store the resolved union repository 862 within the non-transitory union repositories 180. The union repository 862 includes each of the version-specific repositories 852a-n each associated with a corresponding workstation-specific label 856a-n.

In some implementations, client devices 210 may transmit an access request 260 to the repository manager 1000 to obtain (e.g., download) the software distribution. The access request 260 may include a workstation identifier 866 and a repository identifier 654 associated with the software distribution. In response to receiving the access request 260 from the client device 210 at the repository manager 1000, the union service 1006 may obtain the version-specific repository 852 that includes the workstation-specific label 856n associated with the client device 210 by using the workstation identifier 866. In some examples, the union service 1006 uses the workstation identifier 866 to determine whether the client device 210 is associated with one of the assigned workstation-specific labels 856a-n. In other words, the union service 1006 manages the union repository 862 for distributing the applicable version-specific repository 852 to the client device 210 without the client device 210 explicitly indicating the specific version of the repository 862. Instead, the client device 210 may merely request the repository manager 1000 to obtain the software distribution using the access request 260 and the associated repository identifier 654, and the union service 1006 can automatically deploy the appropriate version-specific repository 852 to the client device 210 based on the workstation label (e.g., workstation identifier) 866 and the repository identifier 654 included in the access request 260.

In some examples, user devices 110 may query the union service 1006 to identify all client devices 210 (e.g., workstations) accessing one of the version-specific repositories 852. For instance, it may be beneficial for a software developer to know all workstations using a version-specific repository 852 to execute critical security fixes. In the example shown, the union service 1006 receives a management request 870 from the user device 110 to view all client devices accessing a target version-specific repository 852, wherein the management request includes the workstation-specific label 856 assigned to the target version-specific repository 852. The union service 1006, in response to the management request 870, may query the one or more version-specific repositories included within the union repository 862 using the workstation-specific label 856 to obtain a list 880 of all client devices 210 accessing the target version-specific repository 852 associated with the workstation-specific label 856. The list 880 of client devices 210 may include the workstation identifiers 866a-n each associated with one of the client devices 210.

Figure 9:
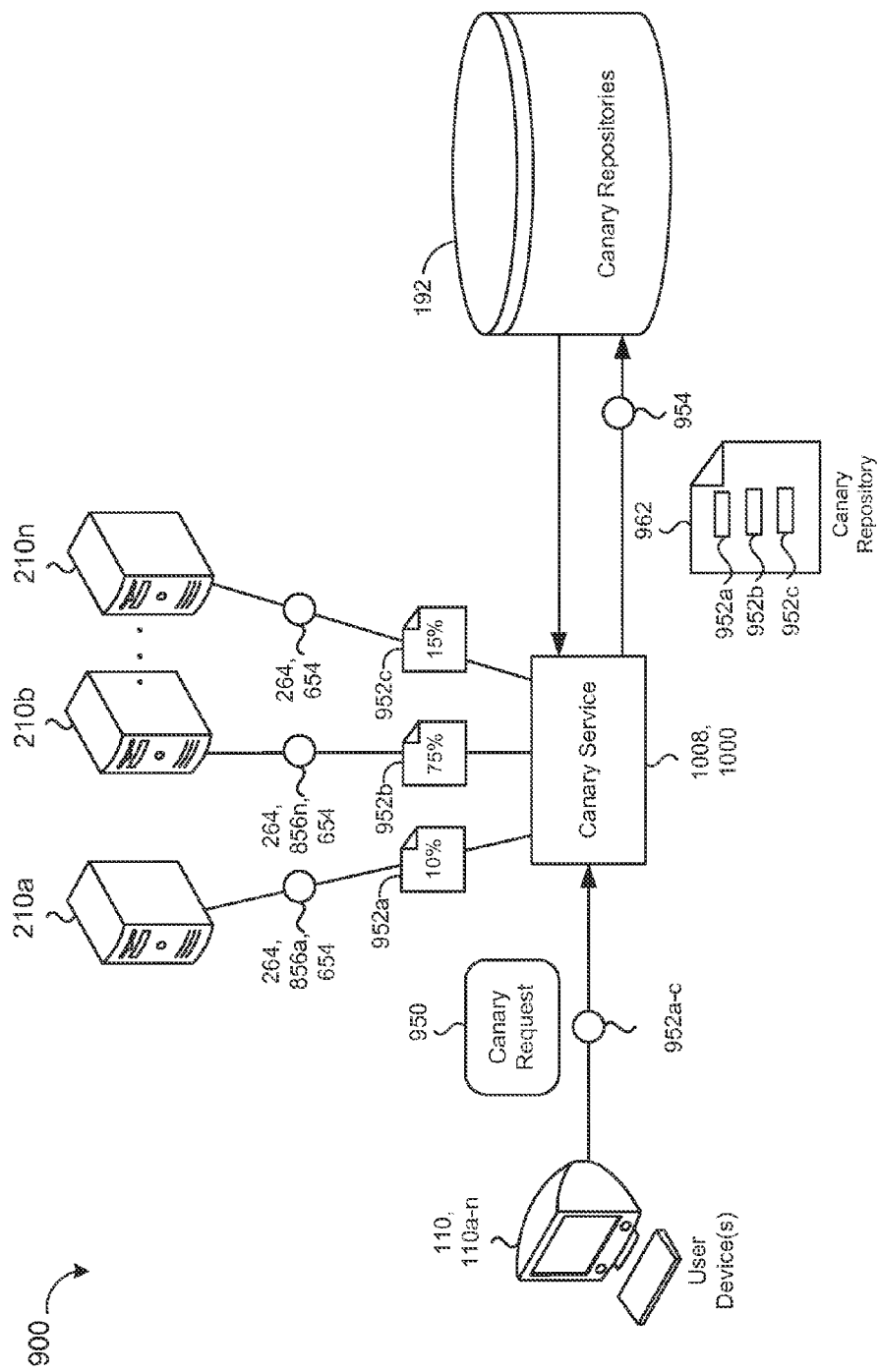
FIG. 9 shows a schematic view of an example canary repository resolved by a canary service executed by the repository manager of FIG. 1.

Referring to FIG. 9, in some implementations, the repository manager 1000 executes a canary service 1008 for resolving a canary repository 962 within non-transitory canary repositories 192 of the non-transitory memory. The canary repository 962 includes a list of target repositories 952a-c each associated with different package content for a software distribution. In some examples, the list of target repositories 952 includes a release candidate repository 952a corresponding to a release candidate version of a software distribution and a stable repository 952b corresponding to a latest release version of the software distribution. In the example shown, the list of target repositories 952 further includes a default target repository 952c corresponding to a default version of the software distribution.

In response to receiving a canary request 950, the canary service 1008 may resolve the canary repository 962 for storage within the non-transitory canary repositories 192. The example shown, the canary request 950 includes the list of target repositories 952a-c for inclusion in the canary repository 962. In some implementations, the canary service 1008 dynamically assigns a distribution weight 954 to each of the target repositories 952. For instance, it may be desirable to initially distribute the release candidate repository 952a to a small percentage of client devices 210 to identify bugs or issues with the release candidate repository 952a, while a higher percentage of the client devices 210 may receive the stable repository 952b. The remaining client devices 210 may receive the default repository 952c in some implementations. As testing of the release candidate repository 952a progresses to reduce bus or issues, the distribution weight 954 applied to each of the target repositories 952 may be adjusted. For instance, the distribution weight 954 applied to the release candidate repository 952a may dynamically increase as the number of bugs and issues decreases until the release candidate repository 952 is distributed to all the client devices 210, and thus, becomes a new stable repository corresponding to a new latest release version of the software distribution. While the distribution weight 954 applied to the release candidate repository 952a dynamically increases, the distribution weight 954 applied to the stable repository 952b proportionally decreases.

In some implementations, client devices 210a-n transmit an access request 264 to the repository manager 1000 to obtain (e.g., download) the software distribution. Each access request 264 may include a repository identifier 654 associated with the software distribution and a work-station specific label 856a-n. In response to receiving one or more access requests 264 from the client devices 210a-n at the repository manager 1000, the canary service 1008 may provide a target repository 952a-c to each client device 210 based upon the associated work-station specific label 856. In some examples, the client devices 212a-n are unaware of the list of target repositories 952a-c, and may unseeingly receive the release candidate repository 254a while expecting the latest release version of the software distribution. When a client device 212 is unaware that of a release candidate repository 254a is being obtained, that client device 212 is more likely to identify bugs or issues with the release candidate version of the software distribution. In the example shown, each access request 264 is associated with the corresponding workstation-specific label 856a-n or may be unlabeled. For instance, client device 212n transmitting the access request 264 may be unlabeled. In response to an access request 264 being associated with one or more workstation-specific labels 856a-n, the canary service 1008 may randomly distribute the release candidate repository 952a to a first percentage (e.g., 10 percent) of the client devices 212 and randomly distribute the stable repository to a second percentage (e.g., 75 percent) of the client devices based on the dynamically assigned distribution weights. In some examples, the canary service 1008 may distribute the default repository 952c to a third percentage (e.g., 15 percent) of the client devices 212 corresponding to the unlabeled client devices 212. The workstation-specific labels 856a-n are monitored by the canary service 1008 such that client devices 212a-n receiving the release candidate repository 254a are not subsequently distributed the stable repository 254b (or default repository 254c) as the distribution weight 954 is dynamically adjusted during throughout testing of the software distribution.

Figure 10:
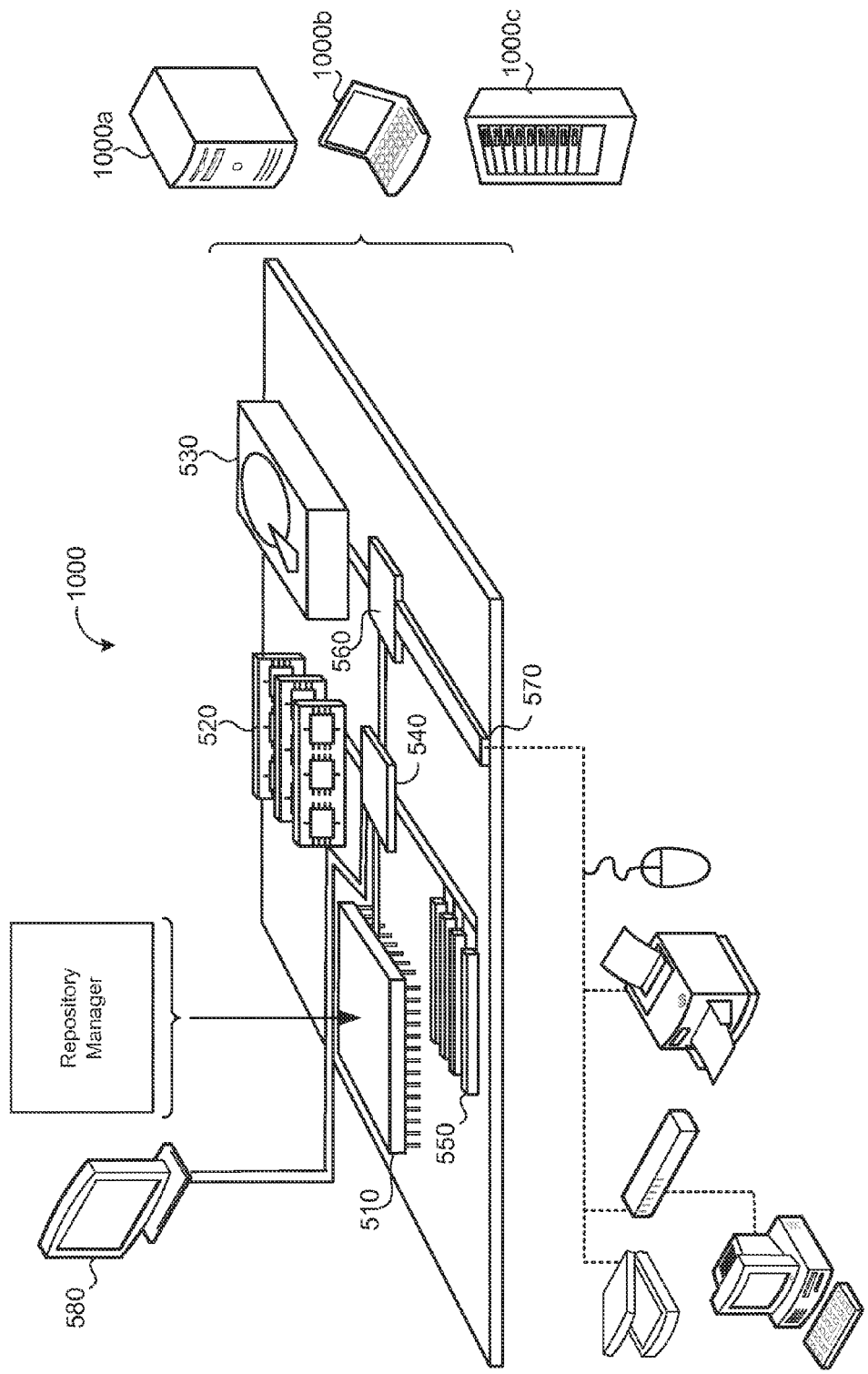
FIG. 10 is a schematic view of an example computing device executing the repository manager of FIG. 1.

FIG. 10 is schematic view of an example computing device 1000 that may be used to implement the systems and methods described in this document, such as the repository manager 1000, the user device 110, and the client device 210. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 510, memory 520, a storage device 530, a high-speed interface/controller 540 connecting to the memory 520 and high-speed expansion ports 550, and a low speed interface/controller 560 connecting to low speed bus 570 and storage device 530. Each of the components 510, 520, 530, 540, 550, and 560, are interconnected using various busses, and may be mounted on a common motherboard or in other manners as appropriate. The processor 510 can process instructions for execution within the computing device 1000, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 520 stores information non-transitorily within the computing device 1000. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 1000. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 1000, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 500a or multiple times in a group of such servers 1000a, as a laptop computer 1000b, or as part of a rack server system 1000c.

In some implementations, the computing device 1000 implementing the repository service 1000 is in communication with non-transitory direct, indirect, union and canary repositories 150, 160, 170, and 192 (e.g., in the memory 620). The processor 610 executes the repository manager 1000 including the direct service 1002, the indirect service 1004, the union service 1006 and the canary service 1008. For example, the direct service 1002 may resolve a new direct repository 252 within the non-transitory direct repositories 150 in response to a package content 258 update associated with a lineage of direct repositories 252a-n. The direct service 1002 may further apply a tag 270 to each direct repository 252 indicating a status of the corresponding direct repository. In some implementations, the indirect service 1004 may determine whether the tag applied to the new direct repository 252 matches an indirection tag 280 associated with an unresolved indirect repository 262, and when the tag 270 applied to the new direct repository 252 matches the indirection tag 280, the indirect service 1004 may resolve the indirect repository 262 pointing to the new direct repository 252.

In other examples, the union service 1006 resolves a union repository 662 that includes a combination of a plurality of member repositories 652a-n that each include a list of one or more package names 656a-n. The union service 1006 may identify an assigned priority 658a-n and an assigned sort order 660a-n for each of the member repositories 652. Thereafter, the union service 1006 may obtain prioritized package names 668 from the member repositories 652 for inclusion in the union repository 662 based on the assigned priorities 658a-n and the assigned sort orders 660a-n. In some implementations, the union service 1006 resolves a union repository 862 that includes a combination of one or more version-specific repositories 852a-n that are each assigned a different workstation-specific label 856a-n. When the repository manager 1000 receives an access request 260 from a client device 210 to obtain a software distribution, the union service 1006 may determine whether the client device is associated with one of the assigned workstation-specific labels 856a-n. In some examples, when the client device 210 is associated with one of the assigned workstation-specific labels 856a-n, the union service 1006 distributes the version-specific repository 852 including one the workstation-specific label 856 associated with the client device 210 to the client device 210.

In some implementations, the canary service 1008 resolves the canary repository 962 including a list of target repositories 952a-c that are each associated with different package content for a software distribution. The list of target repositories may include a release candidate repository corresponding to a release candidate version of the software distribution, and a stable repository corresponding to a latest release version of the software distribution. In some examples, the canary service 1208 dynamically assigns a distribution weight 954 to each of the target repositories 952a-c while the repository manager 1000 receives one or more access requests 264 from client devices 212 to obtain the software distribution, wherein each access request 264 being associated with a repository identifier 654, a corresponding workstation-specific label 856a-n or being unlabeled. In response to the access request 254 being associated with the one or more workstation-specific labels 856a-n, the canary service 1008 may randomly distribute the release candidate repository 952a to a first percentage of the client devices 212 and randomly distributing the stable repository 952b to a second percentage of the client devices 212.

Figure 11:
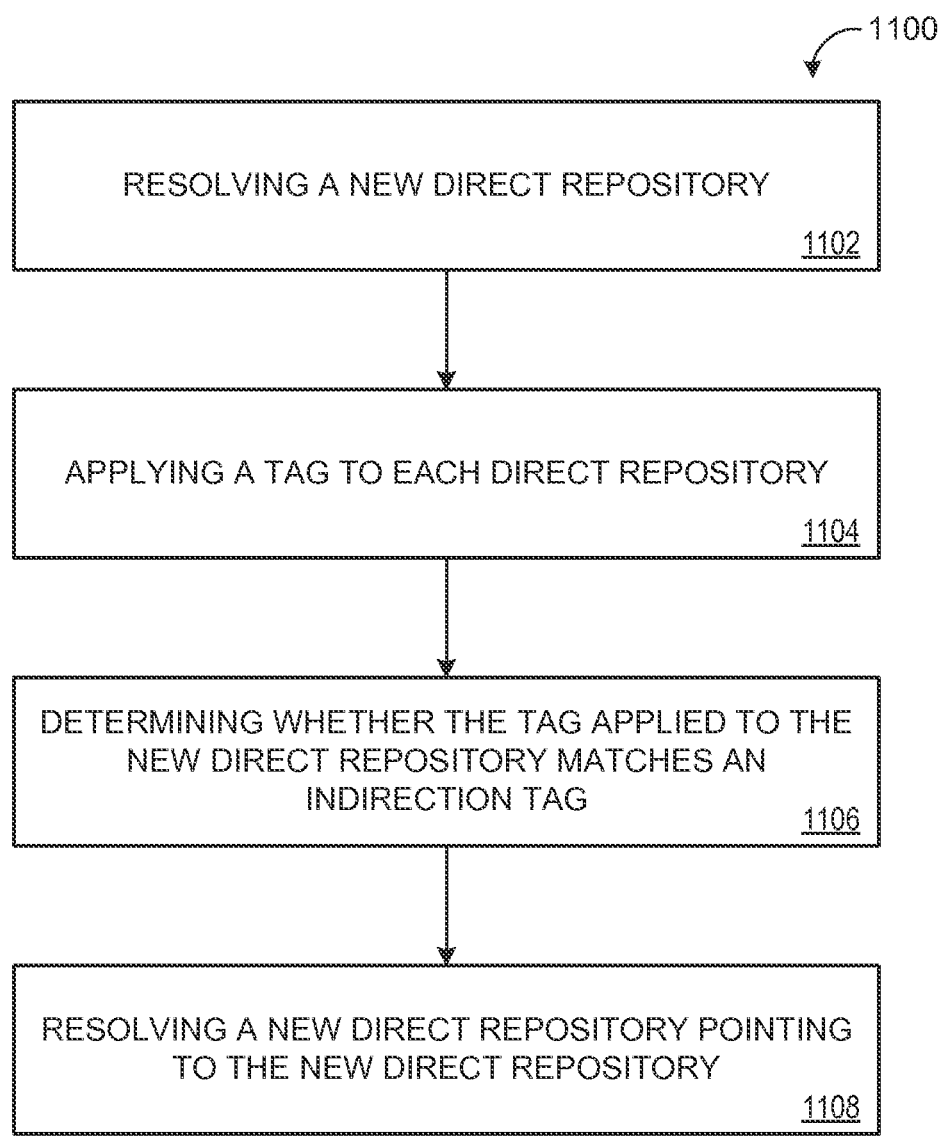
FIG. 11 is a flowchart of an example method for resolving an indirect repository.

FIG. 11 is a flowchart of an example method executed by the computing device 1000 of FIG. 10 for resolving an indirect repository 262. The flowchart starts at operation 1102 when package content 258 associated with a lineage of direct repositories 252a-n updates and the repository manager 1000 resolves a new direct repository 252 within the non-transitory memory, the new direct repository 252 corresponding to a latest direct repository 252 of the lineage of direct repositories 252a-n for storing package content 258. At operation 1104, the repository manager applies a tag to each direct repository 252, wherein each tag 270 includes a key-value pair indicating a status of the corresponding direct repository 252. In some examples, a first tag 270 is applied to direct repositories 252 corresponding to a rolling development version of a software distribution. In some examples, a second tag 270 is applied to direct repositories 252 corresponding to a release candidate version of the software distribution. In other examples, a third tag 270 is applied to direct repositories corresponding to a latest release version of the software distribution. In some implementations, the repository manager 1000 applies a security tag 272 to each of the direct repositories 252a-n, wherein each security tag 272 includes a key-value pair indicating whether or not the direct repository 252 is verified as being secure.

At operation 1106, the repository manager 1000 determines whether the tag 270 applied to the new direct repository matches an indirection tag 280 associated with an unresolved indirect repository 262. At operation 1108 the repository manager 1000 resolves the indirect repository 262 pointing to the new direct repository 252 when the tag 270 applied to the new direct repository matches the indirection tag (and a security tag 272 is verified as being secure). In some examples, for subsequently resolved new indirect repositories 262n+1, the repository manager updates the new indirect repository 262 to point to the latest new indirect repository 252n+1 including the applied tag 270 that matches the indirection tag 280. In an example, when resolving the new indirect repository 262n+1, a flag 290 associated with the indirect repositories 262 increments, wherein the flag 290 indicates a version associated with each indirect repository 262. The repository manager 1000 may store a dynamic list of previous indirect repositories 262 within the non-transitory memory, wherein each previous indirect repository 262 may be identified by the associated flag 290 and the indirection tag 280. In some implementations, the repository manager 1000 receives a pull request 122 to pull a previous indirect repository 262 within the non-transitory manager. The pull request 122 may include the indirection tag 280 and the flag 290 associated with the previous indirect repository. Using the indirection tag 280 and the flag 290, the repository manager 1000 may retrieve and transmit the previous indirect repository 262 to a user device 110 in communication with the repository manager 1000.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   in response to a package content update associated with a lineage of direct repositories, resolving, by a computing device in communication with non-transitory memory, a new direct repository within the non-transitory memory, the new direct repository corresponding to a latest direct repository of the lineage of direct repositories for storing package content;
   applying, by the computing device, a tag to each direct repository, each tag comprising a key-value pair indicating a status of the corresponding direct repository;
   determining, by the computing device, whether the tag applied to the new direct repository matches an indirection tag associated with an unresolved indirect repository;
   when the tag applied to the new direct repository matches the indirection tag, resolving, by the computing device, the unresolved indirect repository, the unresolved indirect repository pointing to the new direct repository;
   for subsequently resolved new indirect repositories, updating, by the computing device, the new indirect repository to point to the latest new direct repository including the applied tag that matches the indirection tag;
   when resolving the new indirect repository to point to the latest new direct repository, incrementing, by the computing device, a flag associated with the indirect repositories, the flag indicating a version associated with each indirect repository; and
   storing, by the computing device, a dynamic list of previous indirect repositories within the non-transitory memory, each previous indirect repository identified by the associated flag and the indirection tag.

2. The method of claim 1, further comprising:
   receiving, at the computing device, a pull request to pull one of the previous indirect repositories within the non-transitory memory, the pull request including the indirection tag and the flag associated with the previous indirect repository;
   retrieving, by the computing device, the previous indirect repository from the non-transitory memory using the indirection tag and the flag included in the pull request; and
   transmitting the previous indirect repository to a user device in communication with the computing device.

3. The method of claim 1, further comprising:
   receiving, at the computing device, an update request to at least one of add one or more packages to or remove one or more packages from the lineage of direct repositories; and
   updating, by the computing device, the package content associated with the lineage of package repositories in response to the request.

4. The method of claim 1, wherein the indirect repository comprises a repository identifier and a list of one or more package versions associated with at least one of:
   a latest version of a software distribution;
   a latest release version of the software distribution;
   a release candidate version of the software distribution; or
   a verified secure version of the software distribution.

5. The method of claim 1, further comprising when applying a tag to each of the direct repositories:
   applying a first tag to direct repositories corresponding to a rolling development version of a software distribution;
   applying a second tag to direct repositories corresponding to a release candidate version of the software distribution; and
   applying a third tag to direct repositories corresponding to a latest release version of the software distribution.

6. The method of claim 1, further comprising when applying a tag to each of the direct repositories, applying a security tag, by the computing device, to each of the direct repositories, each security tag comprising a key-value pair indicating whether or not the direct repository applying the security tag is verified as being secure; and
   when resolving the indirect repository pointing to the new direct repository, requiring, by the computing device, the security tag applied to the new direct repository indicates that the new direct repository is verified as being secure.

7. The method of claim 1, further comprising:
   resolving, at the computing device, a union repository comprising a combination of a plurality of member repositories stored within the non-transitory memory, each member repository comprising a list of one or more package names;
   identifying, at the computing device, an assigned priority and an assigned sort order for each of the member repositories; and
   obtaining, by the computing device, prioritized package names from the member repositories for inclusion in the union repository based on the assigned priorities and the assigned sort orders.

8. The method of claim 7, further comprising when obtaining the prioritized package names from the member repositories for inclusion in the union repository, identifying, by the computing device, whether one or more package names exist in more than one of the member repositories; and
   for each package name that exists in more than one of the member repositories, obtaining, by the computing device, the package name from one of the member repositories based on one of:
      obtaining the package name from the member repository with a highest assigned priority;
      when at least two of the more than one member repositories both include the highest assigned priority, obtaining the package name from the member repository associated with a highest version of the package name; or when at least two of the more than one member repositories both include the highest priority and are both associated with the highest version of the package name, obtaining the package name from the member repository associated with a highest assigned sort order.

9. The method of claim 1, further comprising:
resolving, at the computing device, a union repository comprising a combination of one or more version-specific repositories within the non-transitory memory associated with a software distribution, each version-specific repository assigned a different workstation-specific label and the union repository being unlabeled;
receiving, at the computing device, an access request from a client device in communication with the computing device to obtain the software distribution;
in response to the access request, determining, by the computing device, whether the client device is associated with one of the assigned workstation-specific labels; and
when the client device is associated with one of the assigned workstation-specific labels, distributing the version-specific repository including the workstation-specific label associated with the client device from the computing device to the client device.

10. The method of claim 9, further comprising:
receiving, at the computing device, a management request from a user device in communication with the computing device to view all client devices accessing a target version-specific repository, the management request including the workstation-specific label assigned to the target version-specific repository;
in response to the management request, querying, by the computing device, the one or more version-specific repositories within the non-transitory memory using the workstation- specific label;
obtaining, at the computing device, a list of all client devices accessing the target version-specific label based on the querying; and
transmitting the list of client devices from the computing device to the user device.

11. The method of claim 1, further comprising:
resolving, at the computing device, a canary repository comprising a list of target repositories within the non-transitory memory, each target repository associated with different package content for a software distribution, the list of target repositories comprising:
a release candidate repository corresponding to a release candidate version of the software distribution; and
a stable repository corresponding to a latest release version of the software distribution;
dynamically assigning, by the computing device, a distribution weight to each of the target repositories;
receiving, at the computing device, one or more access requests from client devices in communication with the computing device to obtain the software distribution, each access request being associated with a corresponding workstation-specific label or being unlabeled; and
in response to an access request being associated with one or more workstation-specific labels, randomly distributing, by the computing device, the release candidate repository to a first percentage of the client devices and randomly distributing the stable repository to a second percentage of the client devices, the first and second percentages based on the dynamically assigned distribution weights.

12. A system comprising:
one or more direct service processing devices executing a direct service, the direct service:
in response to a package content update associated with a lineage of direct repositories, resolving a new direct repository within the non-transitory memory, the new direct repository corresponding to a latest direct repository of the lineage of direct repositories for storing package content; and
applying a tag to each direct repository, each tag comprising a key-vale pair indicating a status of the corresponding direct repository; and
one or more indirect service processing devices in communication with the one or more direct service processing devices and executing an indirect service, the indirect service:
determining whether the tag applied to the new direct repository matches an indirection tag associated with an unresolved indirect repository; and
when the tag applied to the new direct repository matches the indirection tag, resolving the unresolved indirect repository pointing to the new direct repository,
wherein the indirect service, at the one or more direct service processing devices, updates, for subsequently resolved new indirect repositories, the new indirect repository to point to the latest new direct repository including the applied tag that matches the indirection tag, and
wherein the indirect service, at the one or more indirect service processing devices, when resolving the new indirect repository to point to the latest new indirect repository:
increments a flag associated with the indirect repositories, the flag indicating a version associated with each indirect repository; and
stores a dynamic list of previous indirect repositories within the non-transitory memory, each previous indirect repository identified by the associated flag and the indirection tag.

13. The system of claim 12, wherein the indirect service, at the one or more indirect service processing devices:
receives a pull request to pull one of the previous indirect repositories within the non-transitory memory, the pull request including the indirection tag and the flag associated with the previous indirect repository;
retrieves the previous indirect repository from the non-transitory memory using the indirection tag and the flag included in the pull request; and
transmits the previous indirect repository to a user device in communication with the indirect service.

14. The system of claim 12, wherein the direct service, at the one or more direct service processing devices:
receives an update request to at least one of add one or more packages to or remove one or more packages from the lineage of direct repositories; and
updates the package content associated with the lineage of package repositories in response to the request.

15. The system of claim 12, wherein the indirect repository comprises a repository identifier and a list of one or more package versions associated with at least one of:
a latest version of a software distribution;
a latest release version of the software distribution;

a release candidate for a version of the software distribution; or a verified secure version of the software distribution.

16. The system of claim 12, wherein the direct service, at the one or more direct service processing devices, when applying a tag to each of the direct repositories:

applies a first tag to direct repositories corresponding to a rolling development version of a software distribution;

applies a second tag to direct repositories corresponding to a release candidate version of the software distribution; and applies a third tag to direct repositories corresponding to a latest release version of the software distribution.

17. The system of claim 12, wherein the direct service, at the one or more direct service processing devices, when applying a tag to each of the direct repositories:

applies a security tag to each of the direct repositories, each security tag comprising a key-value pair indicating whether or not the direct repository applying the security tag is verified as being secure corresponding to a rolling development version of a software distribution; and when resolving the indirect repository pointing to the new direct repository, requires the security tag applied to the new direct repository indicates that the new direct repository is verified as being secure.

18. The system of claim 12, further comprising one or more union processing devices executing a union service, the union service:

resolving a union repository comprising a combination of a plurality of member repositories stored within the non-transitory memory, each member repository comprising a list of one or more package names;

identifying an assigned priority and an assigned sort order for each of the member repositories; and obtaining prioritized package names from the member repositories for inclusion in the union repository based on the assigned priorities and the assigned sort orders.

19. The system of claim 18, wherein the union service, at the one or more union service processing devices, when obtaining the prioritized package names from the member repositories:

identifies whether one or more package names exist in more than one of the member repositories; and for each package name that exists in more than one of the member repositories, obtains the package name from one of the member repositories based on one of:

obtains the package name from the member repository with a highest assigned priority;

when at least two of the more than one member repositories both include the highest assigned priority, obtains the package name from the member repository associated with a highest version of the package name; or when at least two of the more than one member repositories both include the highest priority and are both associated with the highest version of the package name, obtains the package name from the member repository associated with a highest assigned sort order.

20. The system of claim 12, further comprising one or more union processing devices executing a union service, the union service:

resolving a union repository comprising a combination one or more version-specific repositories within the non-transitory member associated with a software distribution, each version-specific repository assigned a different workstation-specific label and the union repository being unlabeled;

receiving an access request from a client device in communication with the union service to obtain the software distribution;

in response to the access request, determining whether the client device is associated with one of the assigned workstation-specific labels;

when the client device is associated with one of the assigned workstation-specific labels, distributing the version-specific repository including the workstation-specific label associated with the client device from the union service to the client device; and obtaining the package names from the member repositories for inclusion in the union repository based on the assigned priorities and the assigned sort orders.

21. The system of claim 20, wherein the union service, at the one or more union processing devices:

receives a management request from a user device in communication with the union service to view all client devices accessing a target version-specific repository, the management request including the workstation-specific label assigned to the target version-specific repository;

in response to the management request, queries the one or more version-specific repositories within the non-transitory member using the workstation-specific label;

obtains a list of all client devices accessing the target version-specific label based on the queries; and transmits the list of client devices from the union service to the user device.

22. The system of claim 12, further comprising one or more canary processing devices executing a canary service, the canary service:

resolving a canary repository comprising a list of target repositories within the non- transitory, each target repository associated with different package content for a software distribution, the list of target repositories comprising:

a release candidate repository corresponding to a release candidate version of the software distribution; and a stable repository corresponding to a latest release version of the software distribution;

dynamically assigning a distribution weight to each of the target repositories;

receiving one or more access requests from client devices in communication with the canary service to obtain the software distribution, each access request being associated with a corresponding workstation-specific label or being unlabeled; and in response to an access request being associated with one or more workstation-specific labels, randomly distributing the release candidate repository to a first percentage of the client devices and randomly distributing the stable repository to a second percentage of the client devices, the first and second percentages based on the dynamically assigned distribution weights.

* * * * *